Mar. 3, 1925.
1,528,129
W. J. PHILLIPS
COLLAPSIBLE BED
Filed March 17, 1923    2 Sheets-Sheet 1
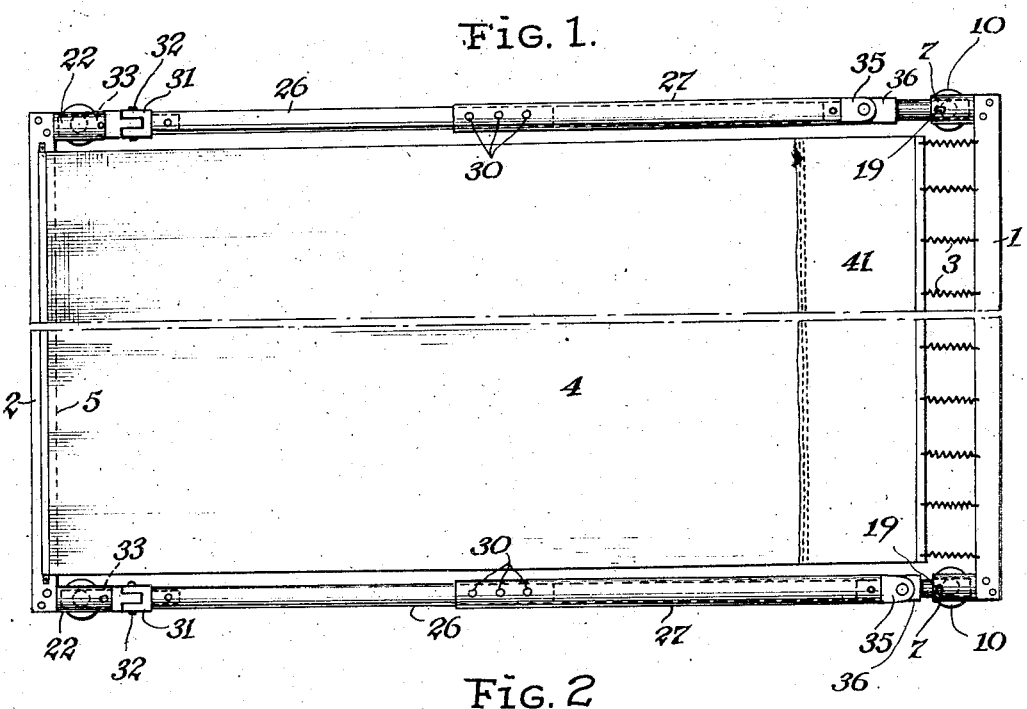
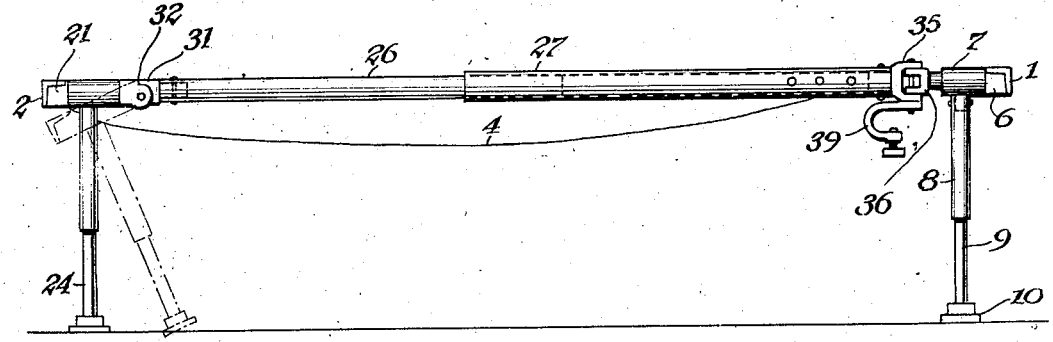
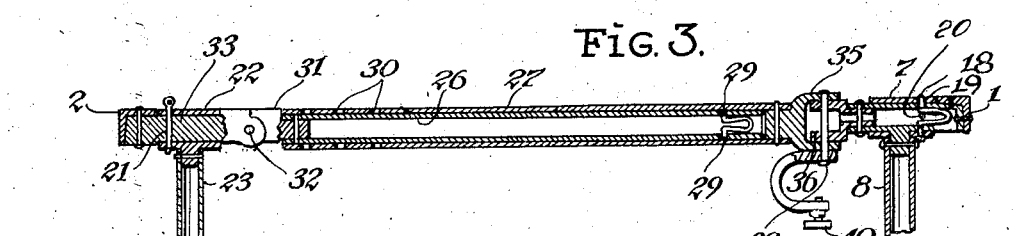
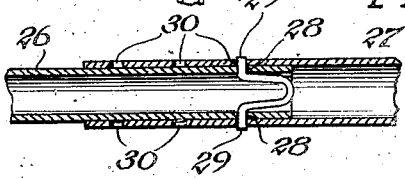
Inventor
WILLIAM J. PHILLIPS.
By Watson E. Coleman
Attorney

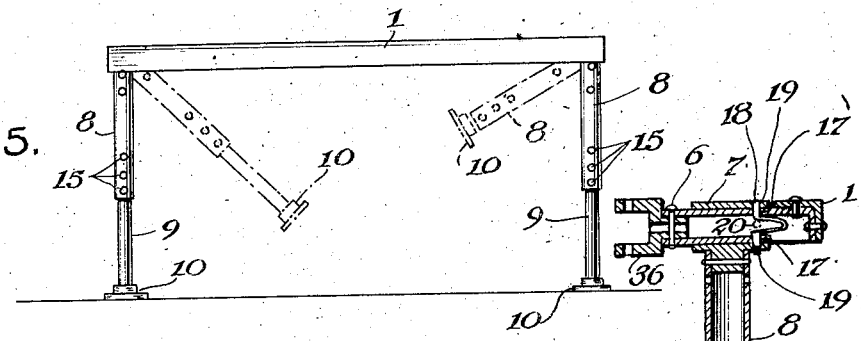
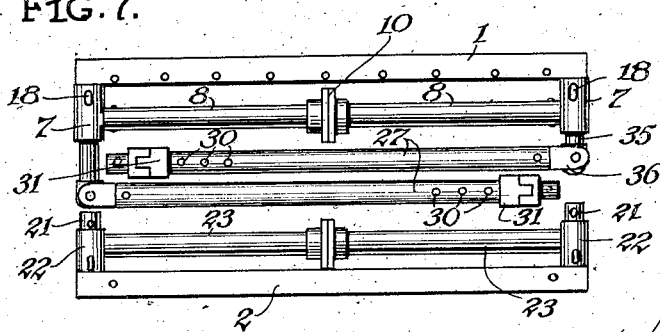
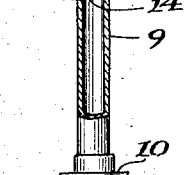
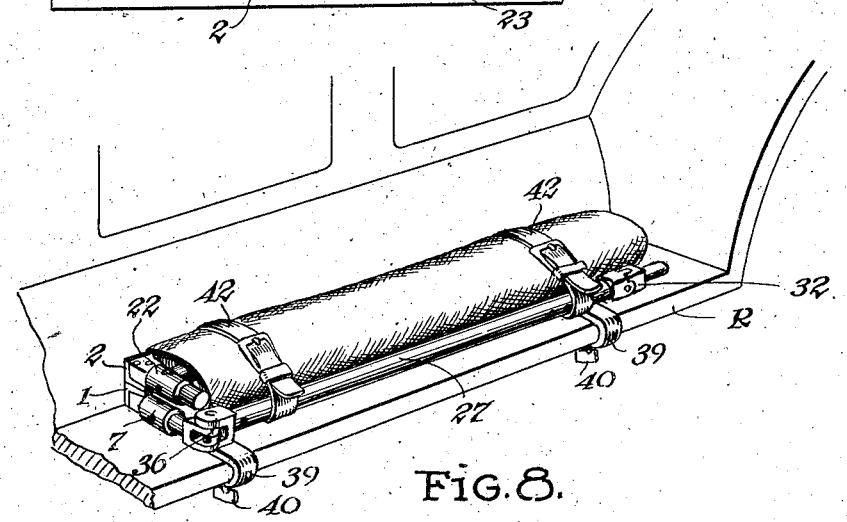

Patented Mar. 3, 1925.

1,528,129

UNITED STATES PATENT OFFICE.

WILLIAM J. PHILLIPS, OF LAVINA, MONTANA, ASSIGNOR TO HERBERT CLEMANS, OF LAVINA, MONTANA.

COLLAPSIBLE BED.

Application filed March 17, 1923. Serial No. 625,800.

*To all whom it may concern:*

Be it known that I, WILLIAM J. PHILLIPS, a citizen of the United States, residing at Lavina, in the county of Golden Valley and State of Montana, have invented certain new and useful Improvements in Collapsible Beds, of which the following is a specification, reference being had to the accompanying drawings.

This invention relates to certain improvements in collapsible beds and has relation more particularly to a device of this general character especially designed and adapted for use by automobile tourists and it is an object of the invention to provide a device of this general character with novel and improved means whereby the same, when collapsed, may be effectively secured to an automobile and more particularly the running board thereof.

Another object of the invention is to provide a novel and improved device of this general character having supporting legs associated therewith and which legs are capable of longitudinal adjustment so that the bed can be readily leveled when supported upon an uneven surface, said adjustment of the legs also permitting the device to be assembled in a manner whereby it can be employed with convenience and facility as a table.

An additional object of the invention is to provide a novel and improved device of this general character comprising end rails connected by a flexible sheet or bottom whereby the folding of the device in its entirety is materially facilitated together with means associated with the end rails for maintaining the flexible sheet or bed bottom taut.

The invention consists in the details of construction and in the combination and arrangement of the several parts of my improved collapsible bed whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a collapsible bed constructed in accordance with an embodiment of my invention;

Figure 2 is a view in side elevation of the structure as illustrated in Figure 1, a second position of certain of the parts being indicated by dotted lines;

Figure 3 is a sectional view taken longitudinally through a side member, the sections thereof being telescoped together, with the parts concomitant thereto;

Figure 4 is an enlarged fragmentary view illustrating in detail the means for holding a section of the side member against relative movement;

Figure 5 is a view in end elevation of the structure as illustrated in Figures 1 and 2 with a second position of the supporting legs indicated by broken lines;

Figure 6 is a view partly in section and partly in elevation of one of the supporting legs as herein disclosed;

Figure 7 is a view in plan of the structure in folded relation, the flexible sheet or body omitted;

Figure 8 is a view in perspective of the device in folded or compacted relation and applied to the running board of an automobile;

As disclosed in the accompanying drawings, my improved device comprises the end rails 1 and 2 of desired length, each comprising an angle iron. One of the rails, as 1 has secured therealong a plurality of helical springs 3 of desired length and which are also operatively engaged with an end portion of a flexible sheet or bed bottom 4 of canvas or other suitable material. The opposite end portion of the sheet 4 is secured as at 5 to the second end rail 2.

The extremities of the end member 1, which may also be termed the head rail, is provided with the laterally directed cylindrical members 6 on each of which is freely mounted a sleeve 7, the sleeve 7 has coupled thereto a tubular leg section 8 whereby said section may be readily adjusted into supporting position or swung inwardly into an inoperative or folded position with respect to the adjacent head member 1.

Telescopically engaged with each of the leg sections 8 is a second or outer leg section 9 provided at its outer end portion with an enlarged rounded foot 10 which operates to prevent the same sinking into the ground or from marring a floor or other surface upon which the device may be positioned.

The inserted end portion of the leg section 9 is provided with the diametrically opposed openings 11 through which project the lugs 12 carried by the extremities of the bow spring 14, said spring 14 constantly urging the lugs 12 outwardly. The inner leg section 8 at predetermined points spaced lengthwise thereof is provided with the diametrically opposed openings 15 through which the lugs 12 are adapted to be selectively disposed. By this means the sections 8 and 9 may be adjusted lengthwise one with respect to the other and held in such adjustment. When it is desired to effect an adjustment of an outer leg section 9 with respect to an inner section 8, the lugs 12 are forced inwardly a distance sufficient to substantially pass entirely through the wall of the section 8 whereupon the leg section 9 is given a slight twist and push or pull whereby the section 9 may be readily adjusted lengthwise of the section 8. Upon the section 9 being rotated to bring the lugs 12 in position to engage through a pair of opposed openings 15, the spring 14 will expand to properly project the lugs 12 through such openings.

Each of the members 6 is also tubular and provided at diametrically opposed points with the openings 17 through which project the spring pressed lugs or pins 18. The associated sleeve 7 is also provided with the diametrically opposed openings 19 in which the lugs or pins 18 engage when the leg section 9 is in its extended or working position. At a point substantially midway the openings 19 the sleeve 7 is provided with an opening 20 with which a lug or pin 18 is engaged when the leg section 8 is swung inwardly into a folded or inoperative position so that when in such position the leg section 8 is effectively held.

The extremities of the second member or foot rail 2 is also provided with laterally directed tubular members 21 each of which is associated with the sleeve 22 carrying a leg section 23. Associated with the leg section 23 is a second leg section 24 telescopically engaged therewith and which is held in its different adjustments with respect to the leg section 23 by spring pressed pins or lugs in the same manner as has hereinbefore been set forth with respect to the leg sections 8 and 9.

My improved device also comprises two side members each comprising two tubular sections 26 and 27, one of said sections as 26 telescopically engaging within the second section 27. The inserted end portion of the member 26 is provided with the diametrically opposed openings 28 through which are disposed the spring pressed pins or lugs 29 adapted to selectively engage within a pair of opposed openings 30 produced in the adjacent end portion of the second member 27. The pairs of openings 30 are spaced longitudinally of the member 27 whereby the extent of a side member may be lengthened or shortened as the requirements of practice may necessitate.

The outer end portion of each of the sections 26 of the side member is provided with a head 31 with which is hingedly connected as at 32 an arm 33 adapted to be received within a tubular member 21. The hinged connection 32 is of a well known break or rule type whereby the arm 33 is free to swing in one direction but is prevented from swinging beyond longitudinal alignment with the section 26.

The outer end portion of each of the sections 27 are each provided with a forked head 35 which receives between the arms thereof the arms of a forked head 36 carried by the outer end portion of a member 6, said arms of the heads 35 and 36 being hingedly or pivotally connected by a vertically disposed pin 38. The pin 38 also serving to hold to the lower arm of the head 35 a U-shaped member 39, said member being disposed in the same general direction as the adjacent section 27 and opening toward the outer end of said section. This member 39 is adapted to straddle the outer or free longitudinal portion of the running board R of the automobile or the like after the structure has been folded or compacted, whereby the structure may be readily and conveniently carried by such vehicle for portage. The free end portion of the member 39 has threaded therethrough a clamping screw 40 adapted to engage the running board R from below whereby the folded or compacted structure is effectively held to said running board against displacement.

The free end portion of the flexible sheet or bottom 4 has secured thereto a flap or pillow 41 extending entirely across said sheet or bottom 4 and of a length to bridge the space between said end of the sheet or bottom 4 and the adjacent end member or head rail 1.

In folding or compacting the structure the arms 33 and the foot member or rail 2 are swung in a direction to relieve the sheet or bottom 4 of strain whereupon the arms 33 are disconnected from the tubular members 21 of the foot member or rail 2. The leg sections 23 and 24 are then compacted to their fullest extent and swung inwardly whereupon the foot member or rail 2 and said folded leg sections are rolled inwardly of the sheet or bottom 4 until the same are superimposed with respect to the head rail or member 1 and the parts concomitant thereto. The leg sections 8 and 9 are also compacted to their fullest extent and swung inwardly. After the side sections 26 and 27 have been compacted to their fullest extent they are swung inwardly to a position substantially parallel to the head member or rail 1 whereupon the compacted or folded structure is maintained in such relation by the suitably applied straps 42.

The assembly of the structure for use is substantially reverse to that just described with respect to the collapsing or compacting of the structure.

The connection of the members 39 is such as to permit the same to be readily and freely rotated as may be desired in order to permit said members to have proper engagement with the running board R.

From the foregoing description it is thought to be obvious that a collapsible bed constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A collapsible bed structure comprising end rails, a flexible sheet connecting said rails, inwardly disposed members carried by the opposite end portions of the end rails, sleeves rotatably engaged with said members, supporting legs secured to said sleeves whereby said sleeves may be swung inwardly of the end rails, side rails, pivotal connections between the arms of one end rail and the adjacent portions of the side rails, said pivotal connections having their axes disposed in a direction to permit the side rails to be swung inwardly with respect to the associated end rail, means for pivotally connecting the opposite end portions of the side rails to the arms of the second end rail, the axis of said last named pivotal connection being substantially at right angles to the axis of the first named pivotal connection, said inwardly disposed members being tubular and provided with openings in their walls, the surrounding sleeves being also provided with openings in their walls to register with the openings in the members, and spring pressed lugs carried by the members and automatically extending through the registering openings of the members and sleeves.

2. A collapsible bed structure comprising end rails, a flexible sheet connecting said rails, inwardly disposed members carried by the opposite end portions of the end rails, sleeves rotatably engaged with said members, supporting legs secured to said sleeves whereby said sleeves may be swung inwardly of the end rails, side rails, pivotal connections between the arms of one end rail and the adjacent portions of the side rails, said pivotal connections having their axes disposed in a direction to permit the side rails to be swung inwardly with respect to the associated end rail, means for pivotally connecting the opposite end portions of the side rails to the arms of the second end rail, the axis of said last named pivotal connection being substantially at right angles to the axis of the first named pivotal connection, means for normally holding the sleeves against rotation upon the arm, said side rails each consisting of telescopically engaged sections, the outer side rail being provided with a series of longitudinally spaced openings, and spring pressed lugs carried by the inserted arm and freely disposed therethrough for selective engagement with the openings in the outer rail.

In testimony whereof I hereunto affix my signature.

WILLIAM J. PHILLIPS.